US 9,507,451 B2

(12) United States Patent
Wang

(10) Patent No.: US 9,507,451 B2
(45) Date of Patent: Nov. 29, 2016

(54) FILE SELECTION METHOD AND TERMINAL

(71) Applicant: Huawei Device Co., Ltd., Shenzhen (CN)

(72) Inventor: Liang Wang, Wuhan (CN)

(73) Assignee: Huawei Device Co., Ltd., Shenzhen (CN)

( * ) Notice: Subject to any disclaimer, the term of this patent is extended or adjusted under 35 U.S.C. 154(b) by 50 days.

(21) Appl. No.: 14/535,435

(22) Filed: Nov. 7, 2014

(65) Prior Publication Data

US 2015/0062051 A1    Mar. 5, 2015

Related U.S. Application Data

(63) Continuation of application No. PCT/CN2013/085910, filed on Oct. 24, 2013.

(30) Foreign Application Priority Data

Oct. 30, 2012  (CN) .......................... 2012 1 0422926

(51) Int. Cl.
| | |
|---|---|
| G06F 3/041 | (2006.01) |
| G06F 3/0488 | (2013.01) |
| G06F 3/0484 | (2013.01) |
| G06F 3/0482 | (2013.01) |
| G06F 17/30 | (2006.01) |

(52) U.S. Cl.
CPC ............. *G06F 3/041* (2013.01); *G06F 3/0416* (2013.01); *G06F 3/0482* (2013.01); *G06F 3/0488* (2013.01); *G06F 3/04842* (2013.01); *G06F 17/30126* (2013.01)

(58) Field of Classification Search
CPC ................. G06F 3/041; G06F 3/0482; G06F 17/30126; G06F 3/04842; G06F 3/0416
See application file for complete search history.

(56) References Cited

U.S. PATENT DOCUMENTS

| | | | |
|---|---|---|---|
| 2007/0229471 A1 | 10/2007 | Kim et al. | |
| 2008/0168403 A1* | 7/2008 | Westerman | G06F 3/04883 715/863 |
| 2011/0126129 A1* | 5/2011 | Nagahara | G06T 11/60 715/753 |

(Continued)

FOREIGN PATENT DOCUMENTS

| | | |
|---|---|---|
| CN | 101046717 A | 10/2007 |
| CN | 102597926 A | 7/2012 |

(Continued)

OTHER PUBLICATIONS

Foreign Communication From a Counterpart Application, European Application No. 13851012.8, Extended European Search Report dated Jul. 17, 2015, 6 pages.

(Continued)

*Primary Examiner* — Andrew Sasinowski
(74) *Attorney, Agent, or Firm* — Conley Rose, P.C.

(57) ABSTRACT

A file selection method and a terminal are disclosed. The file selection method, applied to a terminal with a touchscreen, includes obtaining, by the terminal, a touch track of a user on the terminal, determining, by the terminal, that an area bounded by the track is a selection area when a distance between a starting point of the track and an ending point of the track is less than or equal to a set distance, and selecting, by the terminal according to the determined selection area, a file within the selection area.

12 Claims, 10 Drawing Sheets

(56) References Cited

U.S. PATENT DOCUMENTS

2012/0212443 A1    8/2012   Tomimori
2013/0159941 A1*   6/2013   Langlois ................ G06F 3/017
                                                                      715/863

FOREIGN PATENT DOCUMENTS

CN          102750034 A     10/2012
CN          102929503 A      2/2013
WO         2010044151 A1     4/2010

OTHER PUBLICATIONS

Partial English Translation and Abstract of Chinese Patent Application No. CN102929503A, Nov. 19, 2014, 3 pages.
Foreign Communication From a Counterpart Application, PCT Application No. PCT/CN2013/085910, English Translation of International Search Report dated Jan. 23, 2014, 2 pages.
Foreign Communication From a Counterpart Application, PCT Application No. PCT/CN2013/085910, Written Opinion dated Jan. 23, 2014, 6 pages.

* cited by examiner

FILE SELECTION METHOD AND TERMINAL

CROSS-REFERENCE TO RELATED APPLICATIONS

This application is a continuation of International Application No. PCT/CN2013/085910, filed on Oct. 24, 2013, which claims priority to Chinese Patent Application No. 201210422926.0, filed on Oct. 30, 2012, both of which are hereby incorporated by reference in their entireties.

TECHNICAL FIELD

Embodiments of the present invention relate to communications technologies, and in particular, to a file selection method and a terminal.

BACKGROUND

In recent years, with the maturity of touchscreen technologies, a growing number of suppliers tend to manufacture intelligent terminals with touchscreens. By using a touchscreen to operate an object displayed on the screen of an intelligent terminal, experience of a user in using the intelligent terminal can be enhanced. An object displayed on the screen of an intelligent terminal may be, for example, an application icon, a game object, a folder, or identifiers of various files in a folder, and the foregoing objects are collectively referred to as "file" in the following.

However, when a terminal user needs to select multiple files on a screen, the terminal user needs to select one file on the screen first and then tap, one by one, other files on the terminal screen which need to be selected to complete selection of the multiple files. When a great number of dispersed files need to be selected, it is inconvenient for the user to perform operations, resulting in low efficiency.

SUMMARY

An objective of embodiments of the present invention is to provide a file selection method and a terminal, aiming to solve a problem, in the prior art, of low efficiency in selecting multiple files in any position on a terminal at the same time.

According to a first aspect, the file selection method, applied to a terminal with a touchscreen, includes obtaining, by the terminal, a touch track of a user on the terminal determining, by the terminal, that an area bounded by the track is a selection area when a distance between a starting point of the track and an ending point of the track is less than or equal to a set distance, and selecting, by the terminal according to the determined selection area, a file within the selection area.

In a first possible implementation manner of the first aspect, the obtaining includes obtaining, by the terminal, coordinates of touch points on a touchscreen touched by the user on the terminal and determining, by the terminal, the touch track of the user on the terminal according to the coordinates of the touch points on the touchscreen.

With reference to the first aspect or the first possible implementation manner, in a second possible implementation manner, the determining includes determining a first rectangular area by using the starting point as a center point, determining a second rectangular area by using a process ending point in a changing process of the track as a center point, and starting detection when the first area and the second area intersect for the first time and do not overlap, and determining that the area bounded by the track is the selection area when the first area and the second area are detected to intersect again.

With reference to the first aspect or the first possible implementation manner of the first aspect or the second possible implementation manner of the first aspect, in a third possible implementation manner, the selecting includes selecting, by the terminal according to the determined selection area, a file of which center coordinates are located within the selection area.

With reference to the third possible implementation manner of the first aspect, in a fourth possible implementation manner, the selecting includes determining, by the terminal, a first intersection of a ray that extends from center coordinates of a target file on the touchscreen along a direction parallel to a horizontal axis on the touchscreen and an edge of the selection area on the touchscreen, where a horizontal coordinate of one of two points on the edge of the area, which are adjacent to the first intersection, is greater than a horizontal coordinate of the first intersection, and wherein a horizontal coordinate of the other point is less than the horizontal coordinate of the first intersection, or determining, by the terminal, a second intersection of a ray that extends from center coordinates of at least one file on the touchscreen along a direction perpendicular to a horizontal axis on the touchscreen and an edge of the selection area on the touchscreen, where a vertical coordinate of one of two points on the edge of the area, which are adjacent to the second intersection, is greater than a vertical coordinate of the second intersection, and wherein a vertical coordinate of the other point is less than the vertical coordinate of the second intersection; skipping, by the terminal, selecting the target file when the terminal determines that the number of the first intersections or the second intersections is an even number, and selecting, by the terminal, the target file when the terminal determines that the number of the first intersections or the second intersections is an odd number.

According to a second aspect, the terminal includes an input unit configured to obtain a touch track of a user on the terminal, and a processor configured to perform comparison for the track obtained by the input unit, wherein the processor determines that an area bounded by the track is a selection area when a distance between a starting point of the track and an ending point of the track is less than or equal to a set distance, and selects, according to the selection area determined by the processor, a file within the selection area.

In a first possible implementation manner of the second aspect, with reference to the second aspect, the input unit is configured to obtain coordinates of touch points on a touchscreen touched by the user on the terminal, and determine the touch track of the user on the terminal according to the coordinates of the touch points on the touchscreen.

With reference to the second aspect or the first possible implementation manner of the second aspect, in a second possible implementation manner, the processor is configured to determine a first rectangular area by using the starting point of the track obtained by the input unit as a center point, and determine a second rectangular area by using a process ending point in a changing process of the track as a center point, and wherein detection is started when the first area and the second area intersect for a first time and do not overlap, and determine that the area bounded by the track is the selection area when the input unit detects that the first area and the second area intersect again.

With reference to the second aspect or the first possible implementation manner of the second aspect or the second possible implementation manner of the second aspect, in a third possible implementation manner, the processor is further configured to select, according to the determined selection area, a file of which center coordinates are located within the selection area.

With reference to the third possible implementation manner of the second aspect, in a fourth possible implementation manner, the processor determines a first intersection of a ray that extends from center coordinates of a target file on the touchscreen along a direction parallel to a horizontal axis on the touchscreen and an edge of the selection area on the touchscreen, where a horizontal coordinate of one of two points on the edge of the area, which are adjacent to the first intersection, is greater than a horizontal coordinate of the first intersection, and wherein a horizontal coordinate of the other point is less than the horizontal coordinate of the first intersection, or the processor determines a second intersection of a ray that extends from center coordinates of at least one file on the touchscreen along a direction perpendicular to a horizontal axis on the touchscreen and an edge of the selection area on the touchscreen, where a vertical coordinate of one of two points, on the edge of the area, which are adjacent to the second intersection, is greater than a vertical coordinate of the second intersection, and wherein a vertical coordinate of the other point is less than the vertical coordinate of the second intersection, and wherein the processor skips selecting the target file when the input unit detects that the first area and the second area intersect again, and wherein the processor selects the target file when the processor determines that the number of the first intersections or the second intersections is an odd number.

According to a third aspect, the terminal includes a detecting module configured to obtain a touch track of a user on the terminal, a determining module configured to determine a selection area according to a distance between a starting point of the track and an ending point of the track, wherein the determining module determines that an area bounded by the track is the selection area when the distance between the starting point of the track and the ending point of the track is less than or equal to a set distance, and a selecting module configured to select, according to the selection area determined by the determining module, a file within the selection area.

In a first possible implementation manner of the third aspect, the detecting module is configured to obtain coordinates of touch points on a touchscreen touched by the user on the terminal, and determine the touch track of the user on the terminal according to the coordinates of the touch points on the touchscreen.

With reference to the third aspect or the first possible implementation manner of the third aspect, in a second possible implementation manner, the determining module is configured to determine a first rectangular area by using the starting point of the track obtained by the detecting module as a center point, determine a second rectangular area by using a process ending point in a changing process of the track as a center point, wherein detection is started when the first area and the second area intersect for the first time and do not overlap, and determine that the area bounded by the track is the selection area when the first area and the second area are detected to intersect again.

With reference to the third aspect or the first possible implementation manner of the third aspect or the second possible implementation manner of the third aspect, in a third possible implementation manner, the selecting module is further configured to select, according to the selection area determined by the determining module, a file of which center coordinates are located within the selection area.

With reference to the third possible implementation manner of the third aspect, in a fourth possible implementation manner, the selecting module is further configured to determine a first intersection of a ray that extends from center coordinates of a target file on the touchscreen along a direction parallel to a horizontal axis on the touchscreen and an edge of the selection area on the touchscreen, where a horizontal coordinate of one of two points, on the edge of the area, which are adjacent to the first intersection, is greater than a horizontal coordinate of the first intersection, and wherein a horizontal coordinate of the other point is less than the horizontal coordinate of the first intersection, or determine a second intersection of a ray that extends from center coordinates of at least one file on the touchscreen along a direction perpendicular to a horizontal axis on the touchscreen and an edge of the selection area on the touchscreen, wherein a vertical coordinate of one of two points, on the edge of the area, which are adjacent to the second intersection, is greater than a vertical coordinate of the second intersection, and wherein a vertical coordinate of the other point is less than the vertical coordinate of the second intersection; and the selecting module skips selecting the target file when the selecting module determines that the number of the first intersections or the second intersections is an even number, and the selecting module selects the target file when the selecting module determines that the number of the first intersections or the second intersections is an odd number.

According to the file selection method and the terminal in the embodiments of the present invention, a touch track of a terminal user on a terminal is obtained. When a distance between a starting point of the track and an ending point of the track is less than or equal to a set distance, the terminal may determine that an area bounded by the track is a selection area. This enables multiple files in any position on the terminal to be selected at the same time, making user operations simple and convenient.

BRIEF DESCRIPTION OF DRAWINGS

To describe the technical solutions in the embodiments of the present invention more clearly, the following briefly introduces the accompanying drawings required for describing the embodiments. The accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following clearly describes the technical solutions in the present invention with reference to the accompanying drawings in the present invention. The described embodiments are a part rather than all of the embodiments of the present invention. All other embodiments obtained by persons of ordinary skill in the art based on the embodiments of the present invention without creative efforts shall are located within the protection scope of the present invention.

Embodiments of the present invention provide a file selection method, applied to a terminal, such as a touchscreen phone, a tablet computer, or other devices. The following embodiments are used to describe the present invention in detail.

Figure 1:
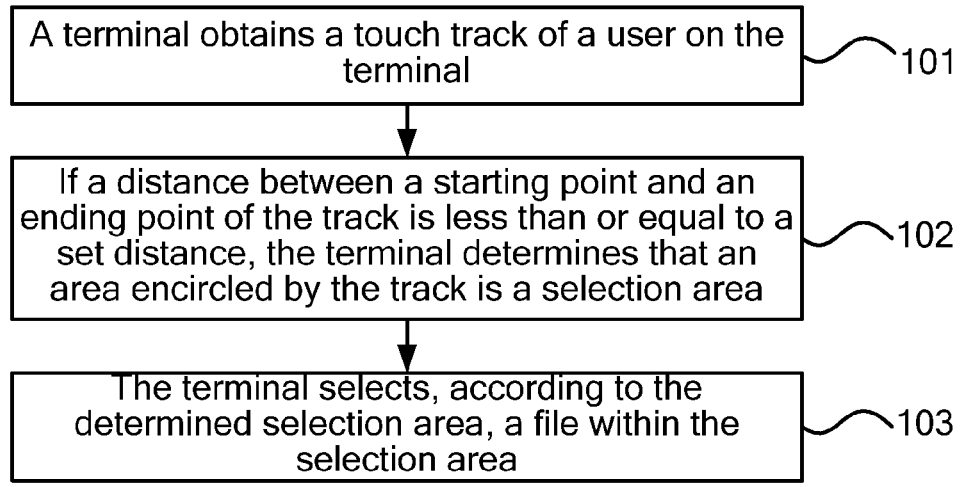
FIG. 1 is a schematic flowchart of a file selection method according to Embodiment 1 of the present invention.

FIG. 1 is a schematic flowchart of a file selection method according to Embodiment 1 of the present invention. As shown in FIG. 1, the file selection method includes the following.

S101: A terminal obtains a touch track of a user on the terminal.

The terminal obtains the touch track of the user on a screen of the terminal in real time. In this embodiment, the touch track may be, for example, a straight line or a curve in any shape, which includes several touch points corresponding to several consecutive touch events.

S102: If a distance between a starting point of the track and an ending point of the track is less than or equal to a set distance, the terminal determines that an area bounded by the track is a selection area.

When obtaining the touch track of the user on the screen of the terminal, the terminal may determine a distance between a starting point and an ending point of the touch track in real time. If the distance between the starting point and the ending point of the touch track is less than or equal to a set distance, the terminal determines that an area bounded by the obtained touch track is a selection area determined by the terminal user on the terminal. The selection area may be an area bounded by a closed curve in any shape, or may be an approximately closed area bounded by a curve in any shape.

In this embodiment, the set distance may be, for example, a theoretical value obtained according to one of parameters such as a size of the terminal screen and a length of a touch track or a combination thereof by using a certain calculation method, or may be an artificially specified empirical value, which is not limited herein. If the distance between the starting point and the ending point of the touch track is less than or equal to the set distance, the terminal determines that a closed space is formed by the touch track, that is, a selection area is formed.

S103: The terminal selects, according to the determined selection area, a file within the selection area.

The terminal may select, according to the foregoing determined selection area, a file within the selection area. That is, the terminal presents the file on the screen of the terminal, which is located within the foregoing determined selection area, on the screen in a manner that indicates the file is selected so as to distinguish the file from other unselected files. In this embodiment, the terminal may, for example, present the file on the screen of the terminal, which is located within the foregoing determined selection area, on the screen in a manner of dimming an icon of the file so as to distinguish the file from other unselected files. One or more files may are located within the foregoing determined selection area. After selection, the terminal user may, for example, further perform an operation such as copying or deleting on the one or more files.

Figure 2A:
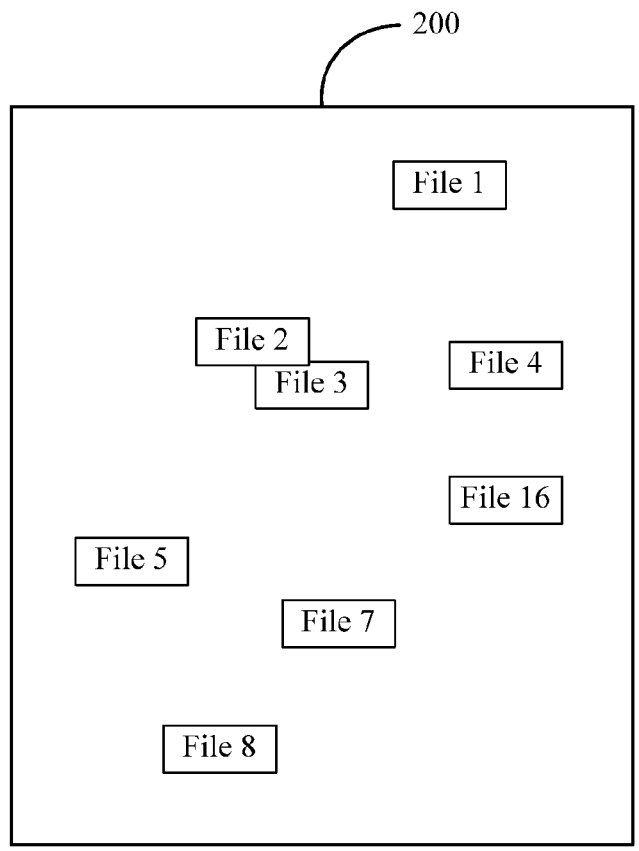
FIG. 2A is a schematic diagram of an operating interface of a terminal according to an embodiment of the present invention.
Figure 2B:
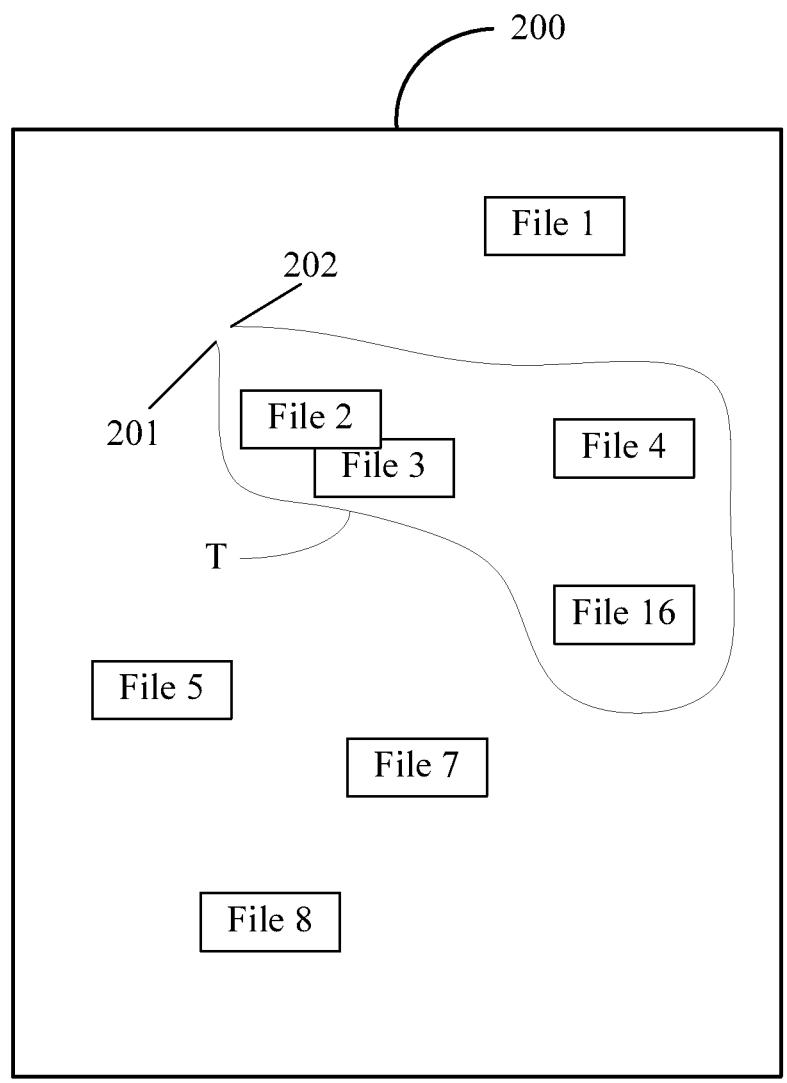
FIG. 2B is a schematic diagram of operating a terminal according to an embodiment of the present invention.

FIG. 2A is a schematic diagram of an operating interface of a terminal according to an embodiment of the present invention, and FIG. 2B is a schematic diagram of operating a terminal according to an embodiment of the present invention. Referring to both FIG. 2A and FIG. 2B, when selecting a file 2, a file 3, a file 4, and a file 16 at the same time on a screen of a terminal 200, a terminal user may use a touch point 201 as a starting point and form a touch track T along the periphery of the file 2, the file 3, the file 4, and the file 16. The terminal 200 detects the touch track in real time. When an ending point of the touch track arrives at 202, if the terminal 200 learns that a distance between the starting point 201 and the ending point 202 is less than or equal to a set distance, the terminal 200 determines that an area bounded by the curve track T is a selection area. The terminal 200 presents, on the terminal screen, the file 2, the file 3, the file 4, and the file 16 within the selection area in a manner of dimming the file 2, the file 3, the file 4, and the file 16. Further, the user of the terminal 200 may further perform a same operation, for example, deleting, on the currently selected file 2, file 3, file 4, and file 16.

In this embodiment of the present invention, a touch track of a terminal user on a terminal is obtained. If a distance between a starting point of the track and an ending point of the track is less than or equal to a set distance, the terminal may determine that an area bounded by the track is a selection area. According to the determined selection area, multiple files in any position on the terminal can be selected at the same time, which makes user operations simple and convenient.

Figure 3:
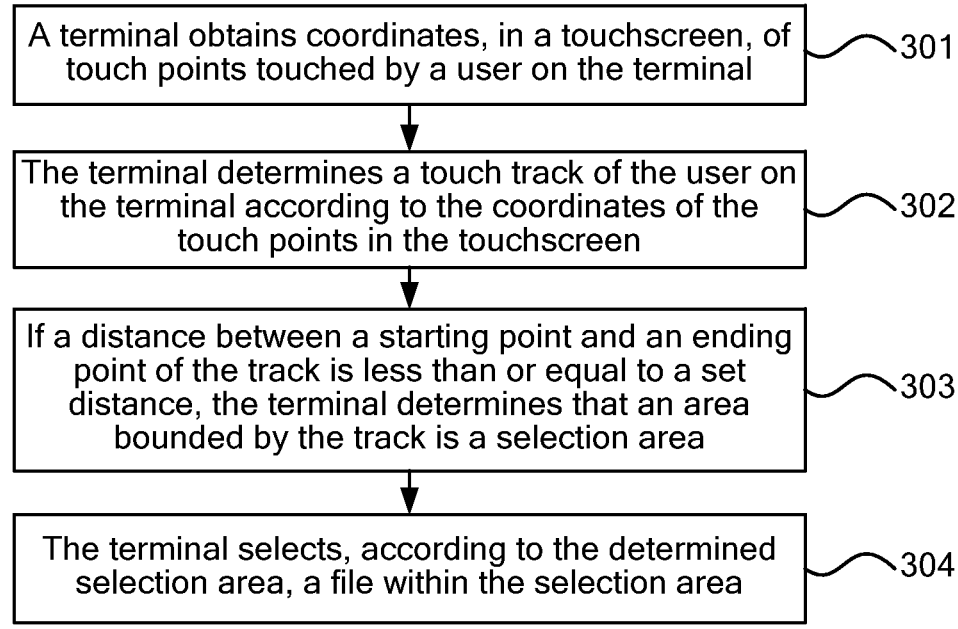
FIG. 3 is a schematic flowchart of a file selection method according to Embodiment 2 of the present invention.

FIG. 3 is a schematic flowchart of a file selection method according to Embodiment 2 of the present invention. As shown in FIG. 3, the file selection method includes the following.

S301: A terminal obtains coordinates, on a touchscreen, of touch points touched by a user on the terminal.

The terminal detects a touch event of the user on a screen of the terminal in real time and determines position coordinates, on the touchscreen, of touch points corresponding to the touch event. Generally, on a touchscreen of a terminal, an upper left corner of the touchscreen is a coordinate origin (0, 0), a horizontal direction is an X axis, a vertical direction is a Y axis, and each touch point corresponding to a touch event has a unique corresponding coordinate value (x, y) in a coordinate system of the touchscreen. The terminal determines position coordinates of the touch points on the touchscreen.

The terminal user may also draw a curve on the touchscreen of the terminal, and the terminal obtains a set of points of the curve track by using a corresponding interface method provided by an Android® or a Windows® Phone platform. The set forms an array according to a sliding order and each point corresponds to a coordinate value. That is, the curve is converted into a set of points with coordinate values.

S302: The terminal determines a touch track of the user on the terminal according to the coordinates of the touch points on the touchscreen.

The terminal determines, according to coordinate values of the foregoing touch points on the touchscreen, a touch track formed by the user on the terminal. In this embodiment, the touch track may include a set of the coordinate values of the touch points on the touchscreen. An order of the coordinate values in the set is consistent with an order in which the coordinate values are formed. That is, a coordinate value corresponding to a touch point that is formed earlier is located before a coordinate value corresponding to a touch point that is formed later.

S303: If a distance between a starting point of the track and an ending point of the track is less than or equal to a set distance, the terminal determines that an area bounded by the track is a selection area.

When obtaining the touch track of the user on the screen of the terminal, the terminal determines a distance between a starting point and an ending point of the touch track in real time according to coordinate values corresponding to the touch points in the touch track. If the distance between the starting point and the ending point of the touch track is less than or equal to a set distance, the terminal determines that an area bounded by the obtained touch track is a selection area determined by the terminal user on the terminal. The selection area may be an area bounded by a closed curve in any shape, or may be an approximately closed area bounded by a curve in any shape. In this embodiment, the set distance may be, for example, a theoretical value obtained according to one of parameters such as a size of the terminal screen and a length of a touch track or a combination thereof by using a certain calculation method, or may be an artificially specified empirical value, which is not limited herein. If the distance between the starting point and the ending point of the touch track is less than or equal to the set distance, the terminal determines that a closed space is formed by the touch track, that is, a selection area is formed.

S304: The terminal selects, according to the determined selection area, a file within the selection area.

The terminal may select, according to the foregoing determined selection area, a file within the selection area. That is, the terminal presents the file on the screen of the terminal, which is located within the foregoing determined selection area, on the screen in a manner that indicates the file is selected so as to distinguish the file from other unselected files. In this embodiment, the terminal may, for example, present the file on the screen of the terminal, which is located within the foregoing determined selection area, on the screen in a manner of dimming an icon of the file so as to distinguish the file from other unselected files. One or more files may be located within the foregoing determined selection area, and after selection, the terminal user may, for example, further perform an operation such as copying or deleting on the one or more files.

In this embodiment of the present invention, coordinates, on a touchscreen, of touch points on a terminal are obtained and a touch track of a user on the terminal is determined according to the coordinates. If a distance between a starting point of the track and an ending point of the track is less than or equal to a set distance, the terminal may determine that an area bounded by the track is a selection area, and selects a file within the selection area according to the selection area. This enables multiple files in any position on the terminal to be selected at the same time, making user operations simple and convenient.

Figure 4:
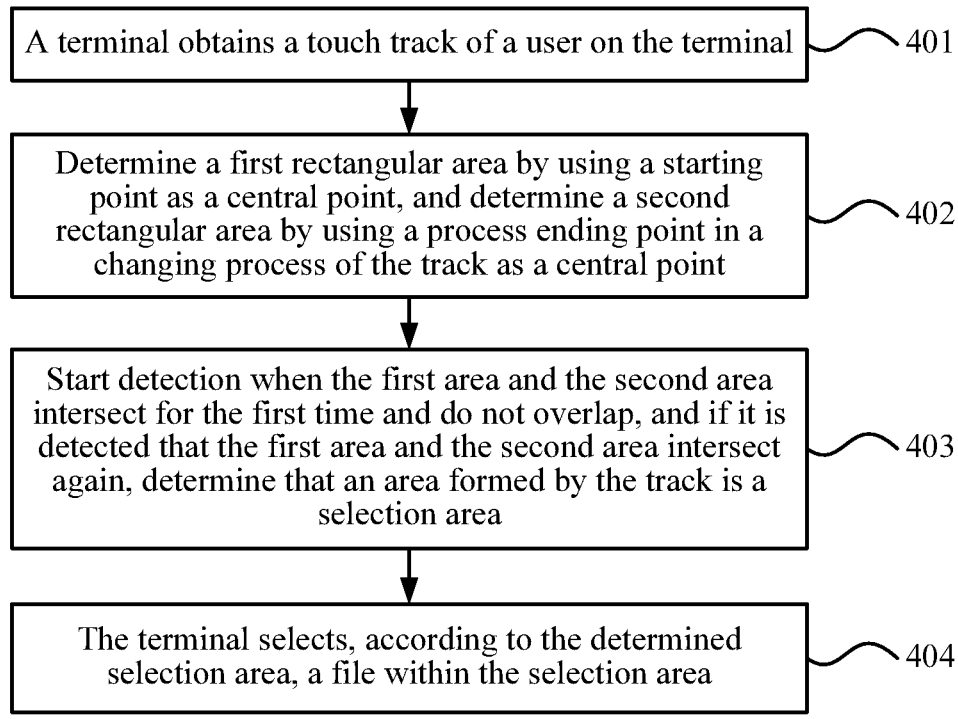
FIG. 4 is a schematic flowchart of a file selection method according to Embodiment 3 of the present invention.

FIG. 4 is a schematic flowchart of a file selection method according to Embodiment 3 of the present invention. As shown in FIG. 4, the file selection method includes the following.

S401: A terminal obtains a touch track of a user on the terminal.

The terminal obtains the touch track of the user on a screen of the terminal in real time. In this embodiment, the touch track may be, for example, a straight line or a curve in any shape, which is formed by several touch points corresponding to several consecutive touch events.

S402: Determine a first rectangular area by using a starting point as a center point, and determine a second rectangular area by using a process ending point in a changing process of the track as a center point.

Figure 6:
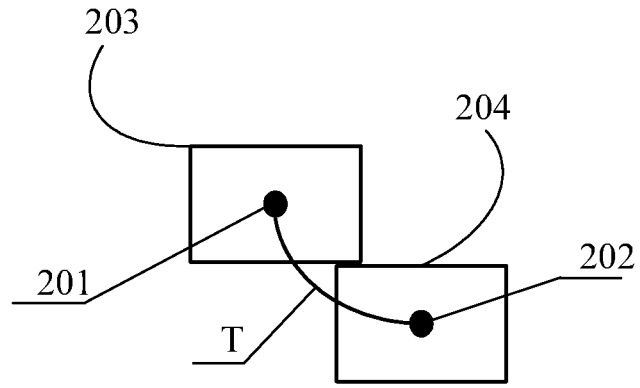
FIG. 6 is a schematic diagram of a state of determining a selection area according to an embodiment of the present invention.

FIG. 6 is a schematic diagram of a state of determining a selection area according to an embodiment of the present invention. As shown in FIG. 6, a terminal determines a first rectangular area 203 by using a starting point 201, which is touched by a user on the terminal, as a center, and determines a second rectangular area 204 by using a process ending point 202 in a changing process of a touch track of the terminal user on the terminal as a center. Sizes of the first rectangular area 203 and the second rectangular area 204 may be obtained according to one of parameters such as a size of the terminal screen and a length of a touch track or a combination thereof by using a certain calculation method, or may be an artificially specified empirical value, and the sizes of the two may be the same.

S403: Start detection when the first area and the second area intersect for the first time and do not overlap, and if it is detected that the first area and the second area intersect again, determine that an area bounded by the track is a selection area.

The terminal starts to detect, in real time, a position relationship between the first rectangular area 203 and the second rectangular area 204 when the first rectangular area 203 and the second rectangular area 204 intersect for the first time and do not overlap, and if the terminal detects again that the first rectangular area 203 and the second rectangular area 204 intersect, the terminal determines that an area bounded by a curve track T is a selection area, where the curve track T starts from the first rectangular area 203 and ends at the second rectangular area 204.

In this embodiment, a selection area may also be determined by determining, using a collision detection algorithm, whether a curve is closed. A rectangular block is drawn around each of the starting point and the ending point of the curve. The starting point does not move, and the ending point slides. Then it is detected whether the two rectangular blocks intersect. If the two rectangular blocks intersect, that is, collision is detected and a closed curve is formed, a selecting operation is determined, and the selecting process ends.

When the starting point and the ending point overlap for the first time, the collision detection algorithm is not enabled. When the rectangular blocks around the starting point and the ending point start to separate after overlapping for the first time, the collision detection algorithm is enabled.

S404: The terminal selects, according to the determined selection area, a file within the selection area.

The terminal may select, according to the foregoing determined selection area, a file within the selection area. That is, the terminal presents the file on the screen of the terminal, which is located within the foregoing determined selection area, on the screen in a manner that indicates the file is selected so as to distinguish the file from other unselected files. In this embodiment, the terminal may, for example, present the file on the screen of the terminal, which is located within the foregoing determined selection area, on the screen in a manner of dimming an icon of the file so as to distinguish the file from other unselected files. One or more files may are located within the foregoing determined selection area, and after selection, the terminal user may, for example, further perform an operation such as copying or deleting on the one or more files.

In this embodiment of the present invention, a selection area is determined by obtaining a position relationship between a first rectangular area and a second rectangular area on a terminal, where the first rectangular area is determined by using a starting point of a touch track as a center point, and the second rectangular area is determined by using an ending point of the touch track as a center point; if the first rectangular area and the second rectangular area intersect twice, it is determined that an area bounded by the touch track is the selection area; and a file within the selection area is selected. This enables multiple files in any position on the terminal to be selected at the same time, making user operations simple and convenient.

Figure 5:
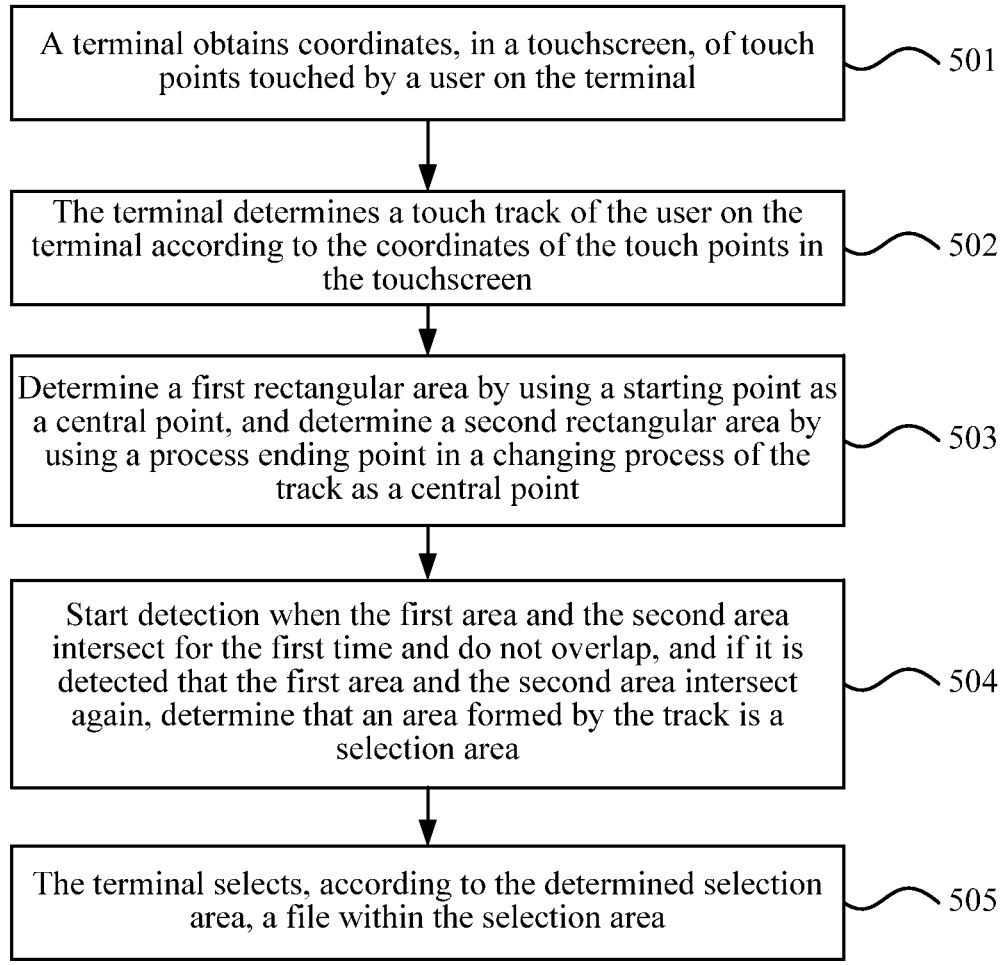
FIG. 5 is a schematic flowchart of a file selection method according to Embodiment 4 of the present invention.

FIG. 5 is a schematic flowchart of a file selection method according to Embodiment 4 of the present invention. As shown in FIG. 5, the file selection method includes the following.

S501: A terminal obtains coordinates, on a touchscreen, of touch points touched by a user on the terminal.

The terminal detects a touch event of a user on a screen of the terminal in real time and determines position coordinates, on the touchscreen, of touch points corresponding to the touch event. Generally, on a touchscreen of a terminal, an upper left corner of the screen of the touchscreen is a coordinate origin (0, 0), a horizontal direction is an X axis, a vertical direction is a Y axis, and each touch point corresponding to a touch event has a unique corresponding coordinate value (x, y) in a coordinate system of the touchscreen. The terminal determines position coordinates of the touch points on the touchscreen.

The terminal user draws a curve on the touchscreen of the terminal, and the terminal may obtain a set of points of the curve track by using a corresponding interface method provided by an Android® or a Windows® Phone platform. The set forms an array according to a sliding order and each point corresponds to a coordinate value. That is, the curve is converted into a set of points with coordinate values.

S502: The terminal determines a touch track of the user on the terminal according to the coordinates of the touch points on the touchscreen.

The terminal determines, according to coordinate values of the foregoing touch points on the touchscreen, a touch track formed by the user on the terminal. In this embodiment, the touch track may include a set of the coordinate values of the touch points on the touchscreen. An order of the coordinate values in the set is consistent with an order in which the coordinate values are formed. That is, a coordinate value corresponding to a touch point that is formed earlier is located before a coordinate value corresponding to a touch point that is formed later.

S503: Determine a first rectangular area by using a starting point as a center point, and determine a second rectangular area by using a process ending point in a changing process of the track as a center point.

FIG. 6 is a schematic diagram of a state of determining a selection area according to an embodiment of the present invention. As shown in FIG. 6, a terminal determines a first rectangular area 203 by using a starting point 201, which is touched by a user on the terminal, as a center, and determines a second rectangular area 204 by using a process ending point 202 in a changing process of a touch track of the terminal user on the terminal as a center. Sizes of the first rectangular area 203 and the second rectangular area 204 may be obtained according to one of parameters such as a size of the terminal screen and a length of a touch track or a combination thereof by using a certain calculation method, or may be an artificially specified empirical value, and the sizes of the two may be the same.

S504: Start detection when the first area and the second area intersect for the first time and do not overlap, and if it is detected that the first area and the second area intersect again, determine that an area bounded by the track is a selection area.

The terminal starts to detect, in real time, a position relationship between the first rectangular area 203 and the second rectangular area 204 when the first rectangular area 203 and the second rectangular area 204 intersect for the first time and do not overlap, and if the terminal detects again that the first rectangular area 203 and the second rectangular area 204 intersect, the terminal determines that an area bounded by a curve track T is a selection area, where the curve track T starts from the first rectangular area 203 and ends at the second rectangular area 204.

In this embodiment, a selection area may also be determined by determining, using a collision detection algorithm, whether a curve is closed. The collision detection algorithm is already widely applied to games. A rectangular block is drawn around each of the starting point and the ending point of the curve; the starting point does not move, and the ending point slides; then it is detected whether the two rectangular blocks intersect. If the two rectangular blocks intersect, that is, collision is detected and a closed curve is formed, a selecting operation is determined, and the selecting process ends.

When the starting point and the ending point overlap for the first time, the collision detection algorithm is not enabled. When the rectangular blocks around the starting point and the ending point start to separate after overlapping for the first time, the collision detection algorithm is enabled.

S505: The terminal selects, according to the determined selection area, a file within the selection area.

The terminal may select, according to the foregoing determined selection area, a file within the selection area. That is, the terminal presents the file on the screen of the terminal, which is located within the foregoing determined selection area, on the screen in a manner that indicates the file is selected so as to distinguish the file from other unselected files. In this embodiment, the terminal may, for example, present the file on the screen of the terminal, which is located within the foregoing determined selection area, on the screen in a manner of dimming an icon of the file so as to distinguish the file from other unselected files. One or more files may are located within the foregoing determined selection area, and after selection, the terminal user may, for example, perform an operation such as copying or deleting on the one or more files.

In this embodiment of the present invention, a touch track of a user on a terminal may be determined by obtaining coordinates of touch points on the terminal; a selection area is determined according to a position relationship between a first rectangular area, which is determined by using a starting point of the touch track as a center point, and a second rectangular area, which is determined by using an ending point of the touch track as a center point. If the first rectangular area and the second rectangular area intersect twice, it is determined that an area bounded by the touch track is the selection area and a file within the selection area is selected. This enables multiple files in any position on the terminal to be selected at the same time, making user operations simple and convenient.

This embodiment further explains and describes in detail the selecting of a file within the selection area in the foregoing Embodiments 1 to 3.

After executing any one of the implementation manners of determining a selection area in the foregoing Embodiments 1 to 4, the terminal determines a first intersection of a ray that extends from center coordinates of a target file on the touchscreen along a direction parallel to a horizontal axis on the touchscreen and an edge of the selection area on the touchscreen, where in the embodiment of the present invention, the center coordinates of the target file is a coordinate value which is defined in an operating system of the terminal and represents the target file, a horizontal coordinate of one of two points on the edge of the selection area, which are adjacent to the first intersection, is greater than a horizontal coordinate of the first intersection, and a horizontal coordinate of the other point is less than the horizontal coordinate of the first intersection, or the terminal determines a second intersection between a ray, which extends from a center coordinate of at least one file on the touchscreen in a direction perpendicular to a horizontal coordinate on the touchscreen, and an edge of the selection area on the touchscreen, where a vertical coordinate of one of two points, on the edge of the selection area, which are adjacent to the second intersection, is greater than a vertical coordinate of the second intersection, and a vertical coordinate of the other point is less than the vertical coordinate of the second intersection.

Figure 7:
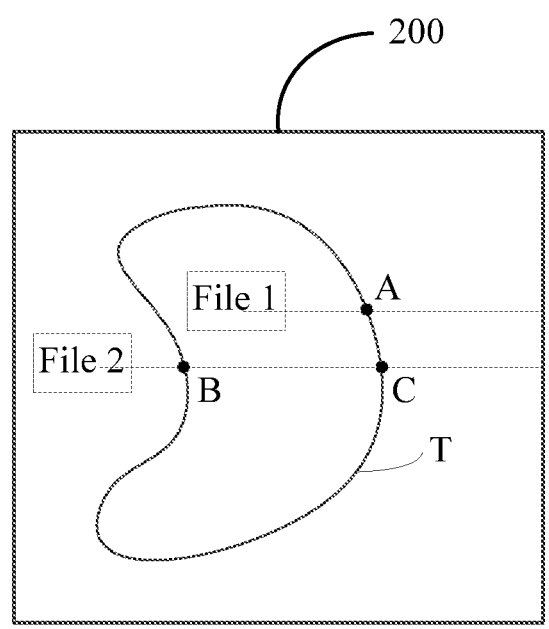
FIG. 7 is a schematic diagram of determining a file within a selection area according to an embodiment of the present invention.

FIG. 7 is a schematic diagram of determining a file within a selection area according to an embodiment of the present invention. As shown in FIG. 7, a terminal 200 determines all files on a touchscreen one by one, so as to determine the number of intersections of rays, which extend from center coordinates of all the files along a coordinate axis direction of the touchscreen, and a touch track of the selection area. First, the terminal 200 obtains center coordinates (Xm, Ym) of a file 2, and compares the horizontal coordinate Xm of the center coordinates of the file 2 with each of horizontal coordinates of touch points in a coordinate set of a touch track T of the selection area in sequence. If two adjacent touch points exist in the coordinate set of the touch track T, where horizontal coordinates X1 and X2 of the two touch points satisfy $X1 \geq Xm \geq X2$ or $X1 \leq Xm \leq X2$, the terminal 200 determines that a ray, which extends from the center coordinates of the file along a horizontal axis direction of the touchscreen, intersects with the touch track T of the selection area, that is, a first intersection B exists. If another two adjacent touch points exist in the coordinate set of the touch track T, where horizontal coordinates X3 and X4 of the two touch points satisfy $X3 \geq Xm \geq X4$ or $X3 \leq Xm \leq X4$, the terminal 200 determines that a ray, which extends from the center coordinates of the file along the horizontal axis direction of the touchscreen, intersects with the touch track T of the selection area, that is, another first intersection C exists, or the vertical coordinate Ym of the center coordinates of the file is compared with each of vertical coordinates of touch points in a coordinate set of a touch track T of the selection area. If two adjacent touch points exist in the coordinate set of the touch track T, where vertical coordinates Y1 and Y2 of the two touch points satisfy $Y1 \geq Ym \geq Y2$ or $Y1 \leq Ym \leq Y2$, the terminal 200 determines that a ray, which extends from the center coordinates of the file along a vertical axis direction of the touchscreen, intersects with the touch track T of the selection area, that is, a second intersection exists. If another two adjacent touch points exist in the coordinate set of the touch track T, where vertical coordinates Y3 and Y4 of the two touch points satisfy $Y3 \geq Ym \geq Y4$ or $Y3 \leq Ym \leq Y4$, the terminal 200 determines that a ray, which extends from the center coordinate of the file along the vertical axis direction of the touchscreen, intersects with the touch track T of the selection area, that is, another second intersection exists.

If the terminal determines that the number of the first intersections or the second intersections is an even number, the terminal skips selecting the target file. If the terminal determines that the number of the first intersections or the second intersections is an odd number, the terminal selects the target file.

Specifically, for example, when the terminal 200 determines that there are 2 first intersections B and C of the file 2 and the touch track T of the selection area, the terminal 200 regards the file 2 as an unselected file. When the terminal 200 determines that there is 1 first intersection A of a file 1 and the touch track T of the selection area, the terminal 200 regards the file 1 as a selected file, and therefore presents the file 1 on the touchscreen of the terminal in a manner of dimming an icon of the file 1.

Figure 8:
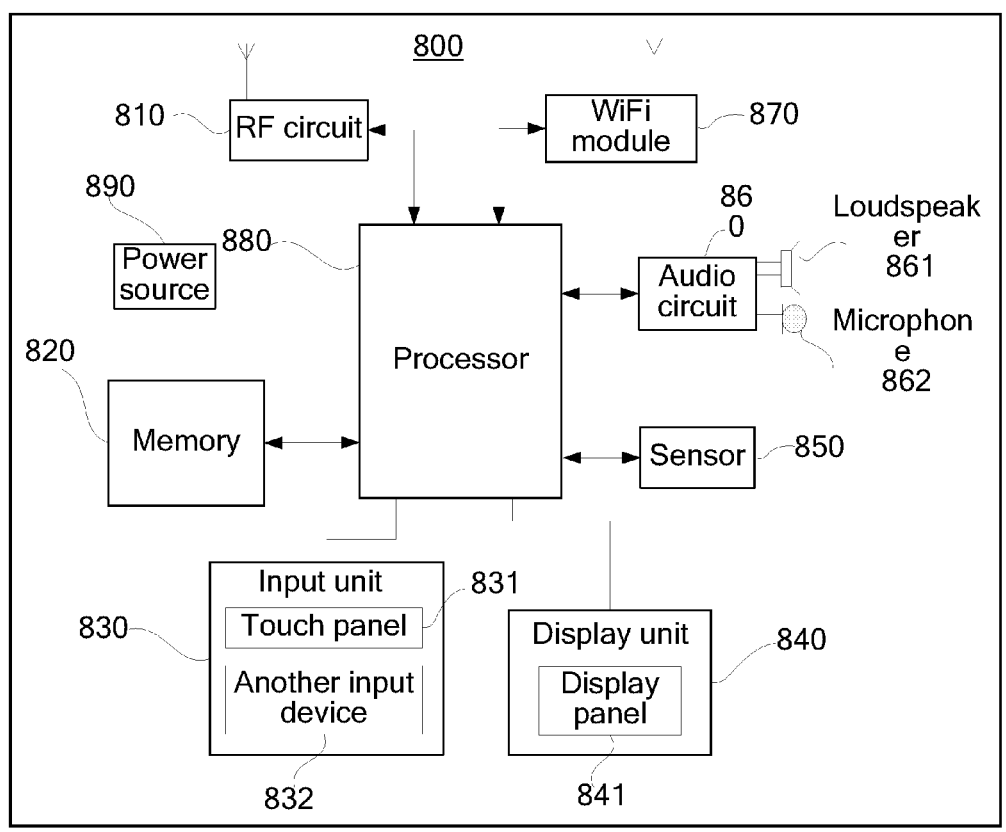
FIG. 8 is a schematic structural diagram of a terminal according to Embodiment 5 of the present invention.

FIG. 8 is a schematic structural diagram of a terminal according to Embodiment 5 of the present invention. As shown in FIG. 8, the terminal according to Embodiment 5 of the present invention can be used to implement the methods implemented in Embodiments 1 to 4 of the present invention. For ease of description, only a part related to this embodiment of the present invention is shown. For undisclosed specific technical details, refer to Embodiment 1 to Embodiment 4 of the method of the present invention.

The terminal may be a terminal device such as a mobile phone, a tablet computer, a Personal Digital Assistant (PDA), a Point of Sales (POS), or a vehicle-mounted computer. Using that the terminal is a mobile phone as an example, FIG. 8 is a block diagram of a part of a structure, of a mobile phone 800, related to the terminal according to the embodiment of the present invention. Referring to FIG. 8, the mobile phone 800 includes components such as a Radio Frequency (RF) circuit 810, a memory 820, an input unit 830, a display unit 840, a sensor 850, an audio circuit 860, a wireless fidelity (WiFi) module 870, a processor 880, and a power source 890. Persons skilled in the art may understand that the mobile phone is not limited to the mobile phone structure shown in FIG. 8 and may include more or less components than those shown in the figure, or a combination of some components, or different component layouts.

The following introduces the components of the mobile phone 800 with reference to FIG. 8.

The RF circuit 810 can be configured to receive and send information or receive or send a signal during a conversation, and especially receive, from a base station, downlink information, and send the downlink information to the processor 880 for processing; and further send involved uplink data to the base station. Generally, the RF circuit includes but is not limited to an antenna, at least one amplifier, a transceiver, a coupler, a Low Noise Amplifier LNA, a duplexer, and the like. In addition, the RF circuit 810 can also communicate with other devices by means of wireless communication or a network. The wireless communication may use any communications standard or protocol, including but not limited to a Global System for Mobile Communication (GSM), a General Packet Radio Service (GPRS), a Code Division Multiple Access (CDMA), a Wideband Code Division Multiple Access (WCDMA), a Long Term Evolution (LTE), an electronic mail (e-mail), an Short Messaging Service (SMS), and the like.

The memory 820 can be configured to store a software program and a module, the processor 880 runs the software program and module stored in the memory 820, so as to execute various function applications and data processing of the mobile phone 800. The memory 820 may mainly include a program storage area and a data storage area. The program storage area may store an operating system, an application program and the like required by at least one function (such as a sound playback function and an image playback function). The data storage area may store data (such as audio data and a phone book) created according to use of the mobile phone 800. In addition, the memory 820 may include a high speed random access memory, and may further include a nonvolatile memory, such as at least one magnetic disk storage device, a flash memory device, or other volatile solid-state storage devices.

The input unit 830 can be configured to receive input digital or character information, and generate key signal input related to a user setting and function control of the mobile phone 800. Specifically, the input unit 830 may include a touch panel 831 and another input device 832. The touch panel 831, also referred to as a touchscreen, can collect a touch operation performed by a user on or near the touch panel 831 (such as an operation performed by a user on the touch panel 831 or near the touch panel 831 with a finger, a touch pen, or any other suitable object), and drive a corresponding connection device according to a preset program. Optionally, the touch panel 831 may include two parts: a touch detecting apparatus and a touch controller. The touch detecting apparatus detects a touch position of a user, detects a signal caused by a touch operation, and transmits the signal to the touch controller. The touch controller receives touch information from the touch detecting apparatus, converts the touch information into touch point coordinates, and then sends the touch point coordinates to the processor 880. The touch controller can receive and execute a command sent by the processor 880. In addition, the touch panel 831 may be of multiple types, such as resistance, capacitance, infrared ray, and surface acoustic wave. Besides the touch panel 831, the input unit 830 may further include another input device 832. The input device 832 may include, but is not limited to, one or more of a physical keyboard, a function key (such as a volume control key and a switch key), a trackball, a mouse, a joystick, and the like.

The display unit 840 can be configured to display information entered by a user or information provided for a user and various menus of the mobile phone 800. The display unit 840 may include a display panel 841, and optionally, the display panel 841 may be configured in a form of an Liquid Crystal Display (LCD), an Organic Light-Emitting Diode (OLED), or the like. Further, the touch panel 831 may cover the display panel 841. When detecting a touch operation on or near the touch panel 831, the touch panel 831 transmits the touch operation to the processor 880 for determining a type of the touch event, and then the processor 880 provides corresponding visual output on the display panel 841 according to the type of the touch event. In FIG. 8, the touch panel 831 and the display panel 841 implement input and output functions of the mobile phone 800 as two independent components. However, in some embodiments, the touch panel 831 and the display panel 841 may be integrated to implement the input and output functions of the mobile phone 800.

The mobile phone 800 may further include at least one type of sensor 850, such as a light sensor, a motion sensor, and other sensors. Specifically, the light sensor may include an ambient light sensor and a proximity sensor, where the ambient light sensor can adjust luminance of the display panel 841 according to brightness of ambient light, and the proximity sensor can turn off the display panel 841 and/or backlight when the mobile phone 800 moves to an ear. As a type of motion sensor, an accelerom sensor can detect magnitude of accelerations in various directions (generally in three axes), and can detect magnitude and a direction of gravity when the accelerom sensor does not move. The accelerom sensor may be used in an application (such as horizontal/vertical screen switch, a relevant game, or magnetometer gesture calibration) that identifies phone gestures and a function (such as a pedometer and knocking) related to vibration identification. The mobile phone 800 may be further provided with other sensors such as a gyroscope, a barometer, a hygrometer, a thermometer, and an infrared sensor, which are not described herein.

The audio circuit 860, a loudspeaker 861, and a microphone 862 can provide audio interfaces between a user and the mobile phone 800. The audio circuit 860 can transmit an electrical signal, which is converted from received audio data, to the loudspeaker 861; and the loudspeaker 861 converts the electrical signal into a sound signal and outputs the sound signal. On the other hand, the microphone 862 converts a collected sound signal into an electrical signal; after receiving the electrical signal, the audio circuit 860 converts the electrical signal into audio data, and then outputs the audio data; and after being processed by the processor 880, the audio data is sent through the RF circuit 810 to, for example, another mobile phone or the audio data is output to the memory 820 for further processing.

WiFi is a short-distance wireless transmission technology. Using the WiFi module 870, the mobile phone 800 can help a user receive and send an e-mail, browse a webpage, access streaming media, and so on. The WiFi module 870 provides wireless broadband Internet access for the user. Although the WiFi module 870 is shown in FIG. 8, it may be understood that the WiFi module 870 is not a requisite part of the mobile phone 800 and can be omitted according to a need without changing the essence of the present invention.

As a control center of the mobile phone 800, the processor 880 connects to all parts of the entire mobile phone by using various interfaces and lines, and executes various functions and data processing of the mobile phone 800 by running or executing the software program and/or module stored in the memory 820 and invoking the data stored in the memory 820, so as to perform overall monitoring on the mobile phone. Optionally, the processor 880 may include one or more processing units. Preferably, the processor 880 may integrate an application processor and a modulation-demodulation processor, where the application processor mainly processes the operating system, a user interface, the application program, and the like, and the modulation-demodulation processor mainly processes wireless communication. It may be understood that the foregoing modulation-demodulation processor may also not be integrated into the processor 880.

The mobile phone 800 further includes the power source 890 (such as a battery) supplying power to the components. Preferably, the power source may be logically connected to the processor 880 by using a power source management system so as to implement functions such as management of charging, discharging, and energy consumption by using the power source management system.

Although not shown in the figure, the mobile phone 800 may further include a camera, a Bluetooth® module, and the like, which are not described herein.

In this embodiment of the present invention, the input unit 830, the memory 820, and the processor 880 included in the terminal may further have the following functions.

The input unit 830 is further configured to sense a touch track of a user on the terminal, and send the touch track to the memory 820.

In this embodiment of the present invention, the touch track may be, for example, a straight line or a curve in any shape, which is formed by several touch points corresponding to several consecutive touch events.

The processor 880 is further configured to perform comparison for the touch track sent by the input unit 830 to the memory 820. If a distance between a starting point and an ending point of the touch track is less than or equal to a set distance, the processor 880 determines that an area bounded by the touch track is a selection area, and selects, according to the foregoing determined selection area, a file within the selection area.

In this embodiment of the present invention, a terminal is provided, including an input unit 830, a memory 820, a processor 880, and the like, where the input unit 830 obtains a touch track of a terminal user on the terminal, and transmits the track to the memory 820; and the processor 880 calculates a distance between a starting point of the track and an ending point of the track stored in the memory 820, and may determine that an area bounded by the track is a selection area if the distance is less than or equal to a set distance. The processor 880 can select multiple files in any position on the terminal at the same time according to the determined selection area. This makes user operations simple and convenient.

Figure 9:
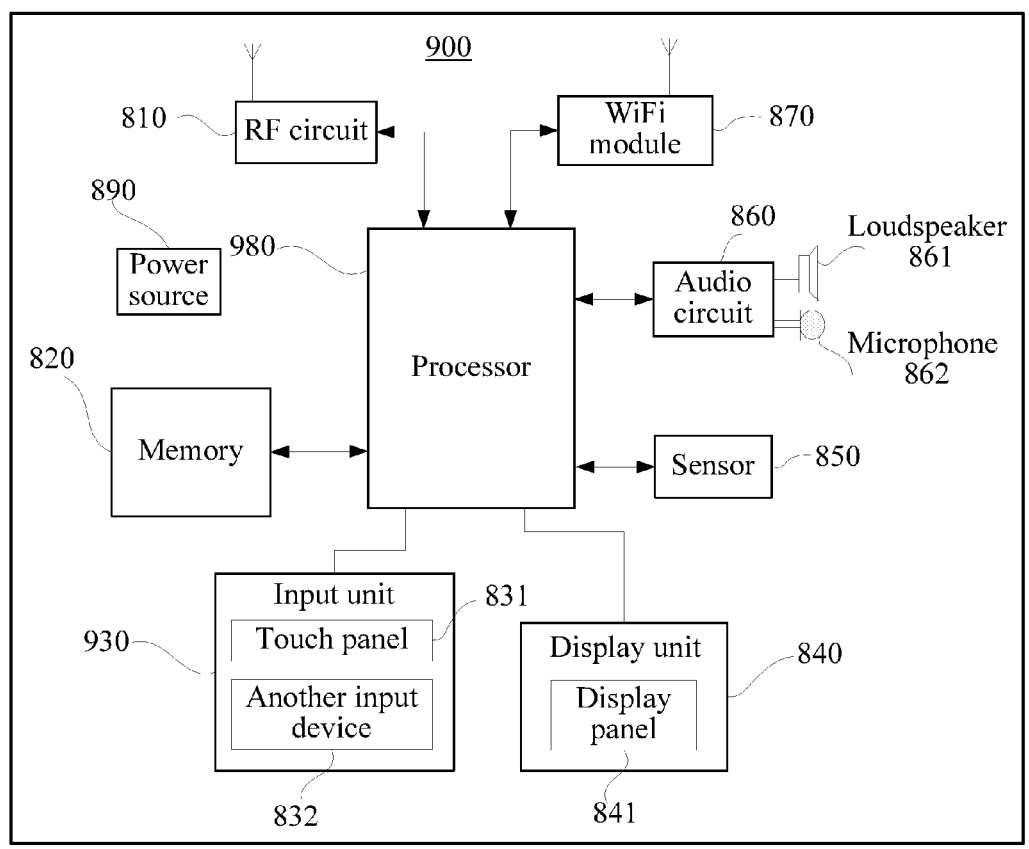
FIG. 9 is a schematic structural diagram of a terminal according to Embodiment 6 of the present invention.

FIG. 9 is a schematic structural diagram of a terminal according to Embodiment 6 of the present invention. As shown in FIG. 9, for ease of description, only a part related to this embodiment of the present invention is shown. The terminal according to Embodiment 6 of the present invention can be used to implement the method implemented in Embodiment 2. For ease of description, only a part related to this embodiment of the present invention is shown. For undisclosed specific technical details, refer to Embodiment 2 of the present invention.

Specifically, FIG. 9 is a block diagram of a part of a structure of a mobile phone 900 related to the terminal according to the embodiment of the present invention. Based on the structure shown in FIG. 8, in this embodiment of the present invention an input unit 930 and a processor 980 are used to respectively replace the input unit 830 and the processor 880 shown in FIG. 8.

The input unit 930 not only has the functions of the input unit 830 in the foregoing Embodiment 5, but is also configured to obtain coordinates, on a touchscreen, of touch points touched by a user on the terminal, determine a touch track of the user on the terminal according to the coordinates of the touch points on the touchscreen, and send the touch track to the memory 820.

The processor 980 not only has the functions of the processor 880 in the foregoing Embodiment 5, but is also configured to perform comparison for the track obtained by the input unit 930 and stored in the memory 820. If a distance between a starting point of the track and an ending point of the track is less than or equal to a set distance, the processor 980 determines that an area bounded by the track is a selection area. The processor 980 is further configured to select, according to the foregoing determined selection area, a file within the selection area.

In this embodiment of the present invention, a terminal is provided, including an input unit 930, a processor 980, and the like, where the input unit 930 obtains coordinates, on a touchscreen, of touch points on the terminal, and determines a touch track of a terminal user on the terminal according to the coordinates. The processor 980 determines a distance between a starting point of the track and an ending point of the track, and if the distance is less than or equal to a set distance, the processor 980 may determine that an area bounded by the track is a selection area. The processor 980 selects a file within the selection area according to the selection area. This enables multiple files in any position on the terminal to be selected at the same time, making user operations simple and convenient.

Figure 10:
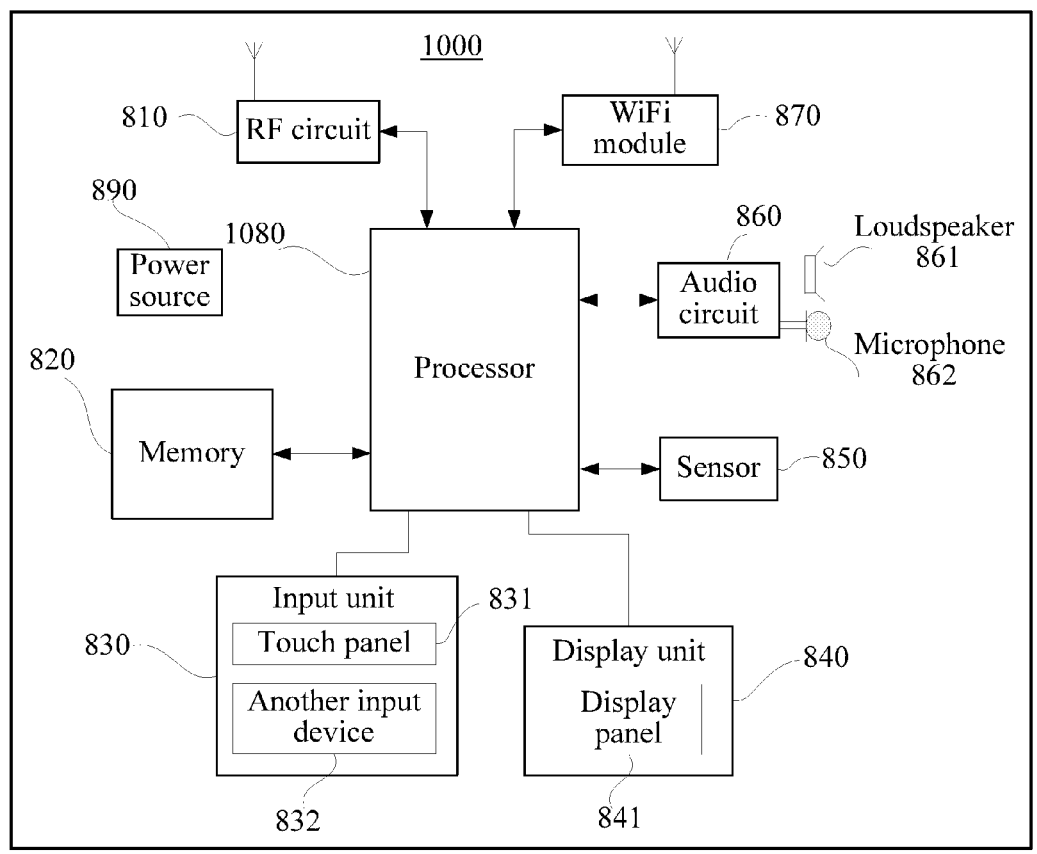
FIG. 10 is a schematic structural diagram of a terminal according to Embodiment 7 of the present invention.

FIG. 10 is a schematic structural diagram of a terminal according to Embodiment 7 of the present invention. As shown in FIG. 10, for ease of description, only a part related to this embodiment of the present invention is shown. The terminal according to Embodiment 7 of the present invention can be used to implement the method in Embodiment 3. For ease of description, only a part related to this embodiment of the present invention is shown. For undisclosed specific technical details, refer to Embodiment 3 of the present invention.

FIG. 10 is a block diagram of a part of a structure of a mobile phone 1000 related to the terminal according to the embodiment of the present invention. Based on the structure shown in FIG. 8, in this embodiment of the present invention, a processor 1080 is used to replace the processor 880 shown in FIG. 8.

The processor 1080 is configured to determine a first rectangular area by using a starting point of a track, which is sensed by the input unit 830 and stored in the memory 820, as a center point, and determine a second rectangular area by using a process ending point in a changing process of the track as a center point. Detection is started when the first area and the second area intersect for the first time and do not overlap, and if the input unit 830 detects that the first area and the second area intersect again, the processor 1080 determines that an area bounded by the track is a selection area, and selects, according to the selection area determined by the processor 1080, a file within the selection area.

In this embodiment of the present invention, a terminal is provided, including a processor 1080 and the like, where an input unit 830 obtains a touch track of a user on the terminal; the processor 1080 determines whether a first rectangular area and a second rectangular area intersect twice, so as to determine a selection area, where the first rectangular area is determined by using a starting point of the touch track as a center point, and the second rectangular area is determined by using an ending point of the touch track as a center point. If the first rectangular area and the second rectangular area intersect twice, the processor 1080 determines that an area bounded by the touch track is the selection area, and selects a file within the selection area. This enables multiple files in any position on the terminal to be selected at the same time, making user operations simple and convenient.

Figure 11:
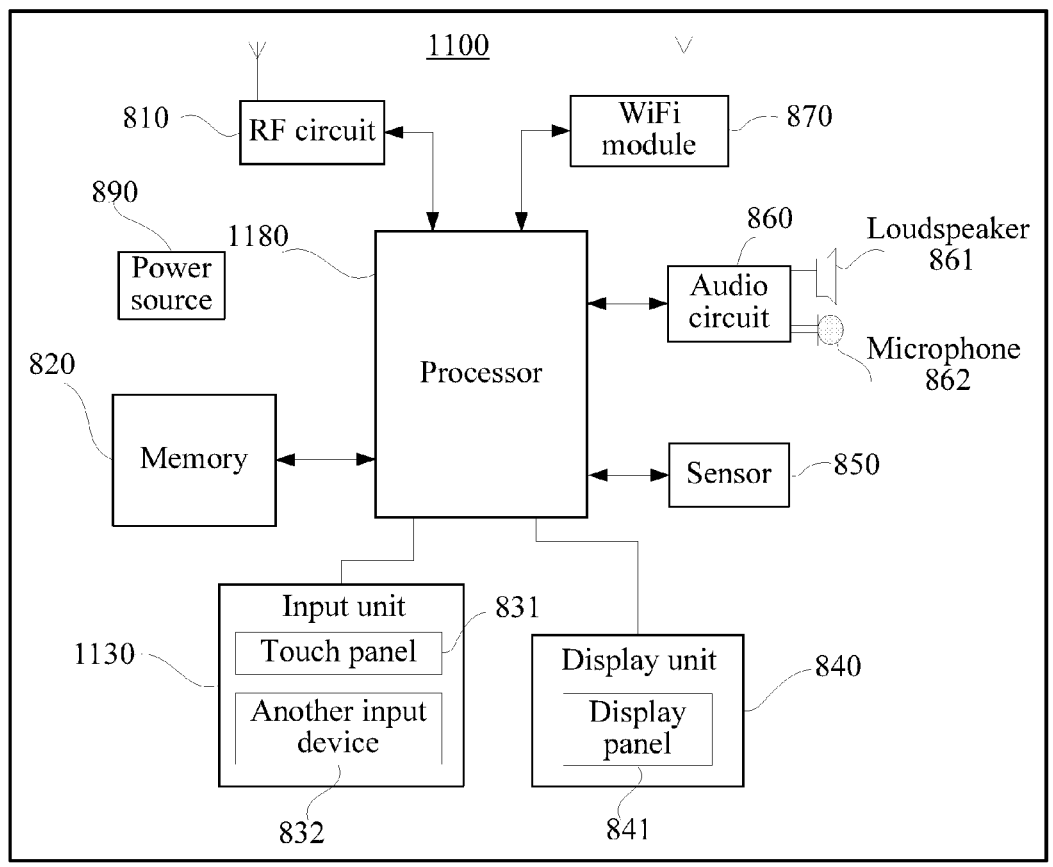
FIG. 11 is a schematic structural diagram of a terminal according to Embodiment 8 of the present invention.

FIG. 11 is a schematic structural diagram of a terminal according to Embodiment 8 of the present invention. As shown in FIG. 11, for ease of description, only a part related to this embodiment of the present invention is shown. The terminal according to Embodiment 8 of the present invention can be used to implement the method implemented in Embodiment 4. For ease of description, only a part related to this embodiment of the present invention is shown. For undisclosed specific technical details, refer to Embodiment 4 of the present invention.

Specifically, FIG. 11 is a block diagram of a part of a structure, of a mobile phone 1100, related to the terminal according to the embodiment of the present invention. Based on the structure shown in FIG. 8, in this embodiment of the present invention, an input unit 1130 and a processor 1180 are used to respectively replace the input unit 830 and the processor 880 shown in FIG. 8.

The input unit 1130 not only has the functions of the input unit 830 in the foregoing Embodiment 5, but is also configured to obtain coordinates, on a touchscreen, of touch points touched by a user on the terminal, determine a touch track of the user on the terminal according to the coordinates of the touch points on the touchscreen, and send the track to the memory 820.

The processor 1180 not only has the functions of the processor 880 in the foregoing Embodiment 5, but is also configured to determine a first rectangular area by using a starting point of the track obtained by the input unit 1130 as a center point, and determine a second rectangular area by using a process ending point in a changing process of the track as a center point. Detection is started when the first area and the second area intersect for the first time and do not overlap, and if the input unit 1130 detects that the first area and the second area intersect again, the processor 1180 determines that an area bounded by the track is a selection area; and the processor 1180 is further configured to select, according to the selection area determined by the processor 1180, a file within the selection area.

In this embodiment of the present invention, a terminal is provided, including an input unit 1130, a processor 1180, and the like, where the input unit 1130 obtains coordinates, on a touchscreen, of touch points on the terminal, and determines a touch track of a user on the terminal according to the coordinates. The processor 1080 determines whether a first rectangular area and a second rectangular area intersect twice, so as to determine a selection area, where the first rectangular area is determined by using a starting point of the touch track as a center point, and the second rectangular area is determined by using an ending point of the touch track as a center point. If the first rectangular area and the second rectangular area intersect twice, the processor 1080 determines that an area bounded by the touch track is the selection area, and selects a file within the selection area. This enables multiple files in any position on the terminal to be selected at the same time, making user operations simple and convenient.

Based on the foregoing terminal Embodiments 5 to 8, further, the processor 880, the processor 980, the processor 1080, or the processor 1180 determines a first intersection of a ray that extends from center coordinates of a target file on the touchscreen along a direction parallel to a horizontal axis on the touchscreen and an edge of the selection area on the touchscreen, where a horizontal coordinate of one of two points, on the edge of the area, which are adjacent to the first intersection, is greater than a horizontal coordinate of the first intersection, and a horizontal coordinate of the other point is less than the horizontal coordinate of the first intersection, or the processor 880, the processor 980, the processor 1080, or the processor 1180 determines a second intersection of a ray that extends from center coordinates of at least one file on the touchscreen along a direction perpendicular to a horizontal axis on the touchscreen and an edge of the selection area on the touchscreen, where a vertical coordinate of one of two points, on the edge of the area, which are adjacent to the second intersection, is greater than a vertical coordinate of the second intersection, and a vertical coordinate of the other point is less than the vertical coordinate of the second intersection.

If determining that the number of the first intersections or the second intersections is an even number, the processor 880, the processor 980, the processor 1080, or the processor 1180 skips selecting the target file; and if determining that the number of the first intersections or the second intersections is an odd number, the processor 880, the processor 980, the processor 1080, or the processor 1180 selects the target file.

Figure 12:
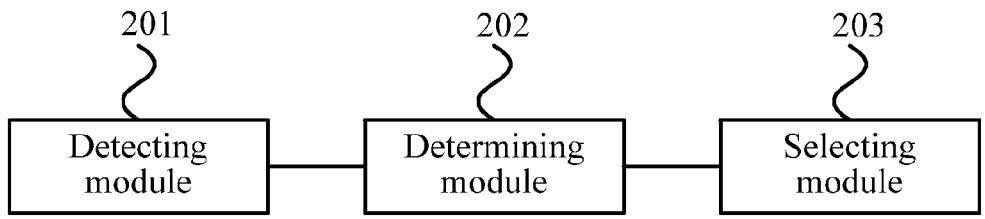
FIG. 12 is a schematic structural diagram of a terminal according to Embodiment 9 of the present invention.

FIG. 12 is a schematic structural diagram of a terminal according to Embodiment 9 of the present invention. As shown in FIG. 12, the terminal includes a detecting module 201, a determining module 202, and a selecting module 203. The detecting module 201 is configured to obtain a touch track of a user on the terminal. The determining module 202 is configured to determine a selection area according to a distance between a starting point of the track and an ending point of the track, where if the distance between the starting point of the track and the ending point of the track is less than or equal to a set distance, the determining module 202 determines that an area bounded by the track is the selection area. The selecting module 203 is configured to select, according to the selection area determined by the determining module 202, a file within the selection area.

On the terminal according to the embodiment of the present invention, a detecting module detects a touch track of a terminal user on the terminal. A determining module determines a distance between a starting point of the track and an ending point of the track, and if the distance is less than or equal to a set distance, determines that an area bounded by the track is a selection area. A selecting module can select multiple files in any position on the terminal at the same time according to the selection area determined by the determining module, which makes user operations simple and convenient.

Figure 13:
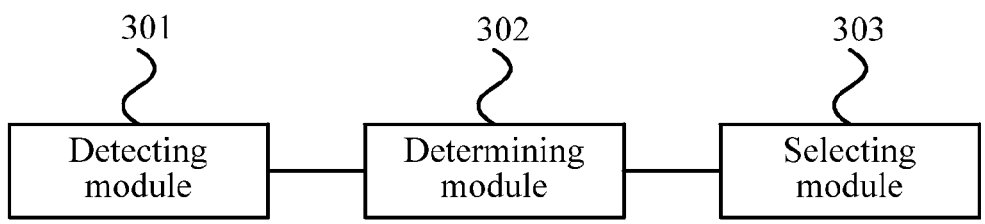
FIG. 13 is a schematic structural diagram of a terminal according to Embodiment 10 of the present invention.

FIG. 13 is a schematic structural diagram of a terminal according to Embodiment 10 of the present invention. As shown in FIG. 13, the terminal includes a detecting module 301, a determining module 302, and a selecting module 303. The detecting module 301 is configured to obtain coordinates, on a touchscreen, of touch points touched by a user on the terminal, and determine a touch track of the user on the terminal according to the coordinates of the touch points on the touchscreen. The determining module 302 is configured to determine a selection area according to a distance between a starting point of the track and an ending point of the track, where if the distance between the starting point of the track and the ending point of the track is less than or equal to a set distance, the determining module 302 determines that an area bounded by the track is the selection area. The selecting module 303 is configured to select, according to the selection area determined by the determining module 302, a file within the selection area.

On the terminal according to the embodiment of the present invention, a detecting module obtains coordinates, on a touchscreen, of touch points on the terminal, and determines a touch track of a terminal user on the terminal according to the coordinates. A determining module determines a distance between a starting point of the track and an ending point of the track, and if the distance is less than or equal to a set distance, determines that an area bounded by the track is a selection area. A selecting module can select a file within the selection area according to the selection area. This enables multiple files in any position on the terminal to be selected at the same time, making user operations simple and convenient.

Figure 14:
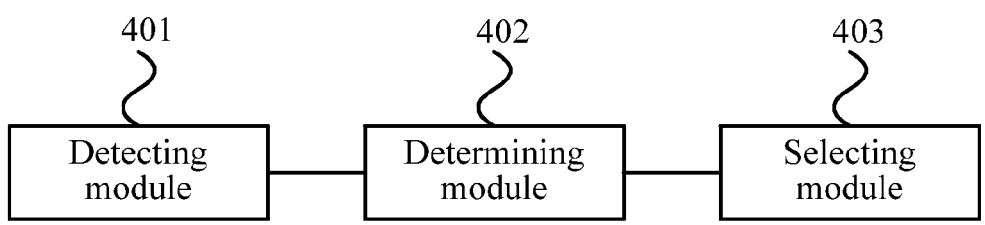
FIG. 14 is a schematic structural diagram of a terminal according to Embodiment 11 of the present invention.

FIG. 14 is a schematic structural diagram of a terminal according to Embodiment 11 of the present invention. As shown in FIG. 14, the terminal includes a detecting module 401, a determining module 402, and a selecting module 403. The detecting module 401 is configured to obtain a touch track of a user on the terminal. The determining module 402 is configured to determine a first rectangular area by using a starting point as a center point, and determine a second rectangular area by using a process ending point in a changing process of the track as a center point. Detection is started when the first area and the second area intersect for the first time and do not overlap, and if it is detected that the first area and the second area intersect again, the determining module 402 determines that an area bounded by the track is a selection area. The selecting module 403 is configured to select, according to the selection area determined by the determining module 402, a file within the selection area.

On the terminal according to the embodiment of the present invention, a detecting module obtains a touch track of a user on the terminal. A determining module determines whether a first rectangular area and a second rectangular area intersect twice, so as to determine a selection area, where the first rectangular area is determined by using a starting point of the touch track as a center point, and the second rectangular area is determined by using an ending point of the touch track as a center point, and if the first rectangular area and the second rectangular area intersect twice, determines that an area bounded by the touch track is the selection area. A selecting module selects a file within the selection area. This enables multiple files in any position on the terminal to be selected at the same time, making user operations simple and convenient.

Figure 15:
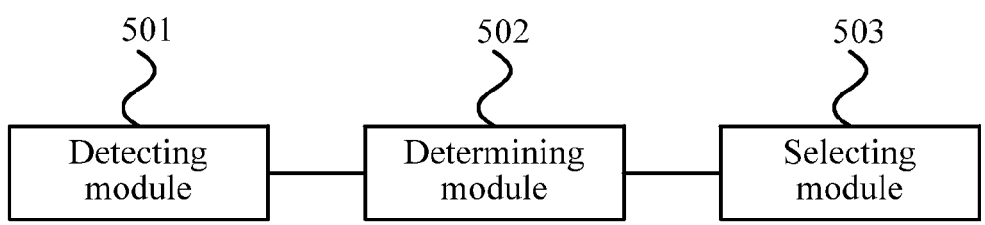
FIG. 15 is a schematic structural diagram of a terminal according to Embodiment 12 of the present invention.

FIG. 15 is a schematic structural diagram of a terminal according to Embodiment 12 of the present invention. As shown in FIG. 15, the terminal includes a detecting module 501, a determining module 502, and a selecting module 503. The detecting module 501 is configured to obtain coordinates, on a touchscreen, of touch points touched by a user on the terminal, and determine a touch track of the user on the terminal according to the coordinates of the touch points on the touchscreen. The determining module 502 is configured to determine a first rectangular area by using a starting point as a center point, and determine a second rectangular area by using a process ending point in a changing process of the track as a center point. Detection is started when the first area and the second area intersect for the first time and do not overlap, and if it is detected that the first area and the second area intersect again, the determining module 502 determines that an area bounded by the track is a selection area. The selecting module 503 is configured to select, according to the selection area determined by the determining module 502, a file within the selection area.

On the terminal according to the embodiment of the present invention, a detecting module obtains coordinates, on a touchscreen, of touch points on the terminal, and determines a touch track of a user on the terminal according to the coordinates. A determining module determines whether a first rectangular area and a second rectangular area intersect twice, so as to determine a selection area, where the first rectangular area is determined by using a starting point of the touch track as a center point, and the second rectangular area is determined by using an ending point of the touch track as a center point, and if the first rectangular area and the second rectangular area intersect twice, determines that an area bounded by the touch track is the selection area. A selecting module selects a file within the selection area. This enables multiple files in any position on the terminal to be selected at the same time, making user operations simple and convenient.

This embodiment further explains and describes in detail the selecting of a file by the selecting module within the selection area in the foregoing Embodiments 9 to 12.

The selecting module is further configured to determine a first intersection of a ray that extends from center coordinates of a target file on the touchscreen along a direction parallel to a horizontal axis on the touchscreen and an edge of the selection area on the touchscreen, where a horizontal coordinate of one of two points, on the edge of the area, which are adjacent to the first intersection, is greater than a horizontal coordinate of the first intersection, and a horizontal coordinate of the other point is less than the horizontal coordinate of the first intersection, or determine a second intersection of a ray that extends from center coordinates of at least one file on the touchscreen along a direction perpendicular to a horizontal axis on the touchscreen and an edge of the selection area on the touchscreen, where a vertical coordinate of one of two points, on the edge of the area, which are adjacent to the second intersection, is greater than a vertical coordinate of the second intersection, and a vertical coordinate of the other point is less than the vertical coordinate of the second intersection.

If the selecting module determines that the number of the first intersections or the second intersections is an even number, the selecting module skips selecting the target file. If the selecting module determines that the number of the first intersections or the second intersections is an odd number, the selecting module selects the target file.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read only memory (ROM), a random access memory (RAM), a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A file selection method, applied to a terminal with a touchscreen, comprising:
   obtaining, by the terminal, a touch track of a user on the terminal;
   determining, by the terminal, that an area bounded by the track is a selection area when a distance between a starting point of the track and an ending point of the track is less than or equal to a set distance, wherein the starting point is different than the ending point;
   selecting, by the terminal according to the selection area determined, a file within the selection area, wherein the selecting comprises selecting, by the terminal according to the determined selection area, a file of which center coordinates are located within the selection area;
   determining, by the terminal, one of:
      a first intersection of a ray that extends from center coordinates of a target file on the touchscreen along a direction parallel to a horizontal axis on the touchscreen and an edge of the selection area on the touchscreen, wherein a horizontal coordinate of one of two points on the edge of the area, which are adjacent to the first intersection, is greater than a horizontal coordinate of the first intersection, and wherein a horizontal coordinate of the other point is less than the horizontal coordinate of the first intersection; and
      a second intersection of a ray that extends from center coordinates of at least one file on the touchscreen along direction perpendicular to a horizontal axis on the touchscreen and an edge of the selection area on the touchscreen, wherein a vertical coordinate of one of two points on the edge of the area, which are adjacent to the second intersection, is greater than a vertical coordinate of the second intersection, and wherein a vertical coordinate of the other point is less than the vertical coordinate of the second intersection; and
   skipping, by the terminal, selecting the target file when the terminal determines that the number of the first intersections or the second intersections is an even number, and selecting, by the terminal, the target file when the terminal determines that the number of the first intersections or the second intersections is an odd number.

2. The method according to claim 1, wherein the obtaining comprises:
   obtaining, by the terminal, coordinates of touch points on a touchscreen touched by the user on the terminal; and
   determining, by the terminal, the touch track of the user on the terminal according to the coordinates of the touch points on the touchscreen.

3. The method according to claim 2, wherein the determining comprises:
   determining a first rectangular area by using the starting point as a center point;
   determining a second rectangular area by using a process ending point in a changing process of the track as a center point;
   starting detection when the first area and the second area intersect for a first time and do not overlap; and
   determining that the area bounded by the track is the selection area when the first rectangular area and the second rectangular area are detected to intersect again.

4. The method according to claim 1, wherein the determining comprises:
   determining a first rectangular area by using the starting point as a center point, and determining a second rectangular area by using a process ending point in a changing process of the track as a center point;
   starting detection when the first area and the second area intersect for a first time and do not overlap; and
   determining that the area bounded by the track is the selection area when the first rectangular area and the second rectangular area are detected to intersect again.

5. A terminal, comprising:
   an input unit configured to obtain a touch track of a user on the terminal; and
   a processor configured to perform comparison for the track obtained by the input unit, wherein the processor:
      determines that an area bounded by the track is a selection area when a distance between a starting point of the track and an ending point of the track is less than or equal to a set distance, wherein the starting point is different than the ending point;
      selects, according to the selection area determined by the processor, a file within the selection area and having a center coordinate located within the selection area;
      determines one of:
         a first intersection of a ray that extends from center coordinates of a target file on the touchscreen along a direction parallel to a horizontal axis on the touchscreen and an edge of the selection area on the touchscreen, wherein a horizontal coordinate of one of two points on the edge of the area, which are adjacent to the first intersection, is greater than a horizontal coordinate of the first intersection, and wherein a horizontal coordinate of the other point is less than the horizontal coordinate of the first intersection, and
         a second intersection of a ray that extends from center coordinates of at least one file on the touchscreen along a direction perpendicular to a horizontal axis on the touchscreen and an edge of the selection area on the touchscreen, wherein a vertical coordinate of one of two points on the edge of the area, which are adjacent to the second intersection, is greater than a vertical coordinate of the second intersection, and wherein a vertical coordinate of the other point is less than the vertical coordinate of the second intersection, and
      skips selecting the target file when the processor determines that the number of the first intersections or the second intersections is an even number, and the processor selects the target file when the processor determines that the number of the first intersections or the second intersections is an odd number.

6. The terminal according to claim 5, wherein the input unit is configured to obtain coordinates of touch points on a touchscreen touched by the user on the terminal, and determine the touch track of the user on the terminal according to the coordinates of the touch points on the touchscreen.

7. The terminal according to claim 6, wherein the processor is configured to determine a first rectangular area by using the starting point of the track obtained by the input unit as a center point, and determine a second rectangular area by using a process ending point in a changing process of the track as a center point, and wherein detection is started when the first area and the second area intersect for a first time and do not overlap, and determine that the area bounded by the track is the selection area when the input unit detects that the first area and the second area intersect again.

8. The terminal according to claim 5, wherein the processor is configured to determine a first rectangular area by using the starting point of the track obtained by the input unit as a center point, and determine a second rectangular area by using a process ending point in a changing process of the track as a center point, and wherein detection is started when the first area and the second area intersect for a first time and do not overlap, and determine that the area bounded by the track is the selection area when the input unit detects that the first area and the second area intersect again.

9. A terminal, comprising:
   a detecting module configured to obtain a touch track of a user on the terminal;
   a determining module configured to determine a selection area according to a distance between a starting point of the track and an ending point of the track, wherein the starting point is different than the ending point, and wherein the determining module determines that an area bounded by the track is the selection area when the distance between the starting point of the track and the ending point of the track is less than or equal to a set distance; and
   a selecting module configured to:
      select, according to the selection area determined by the determining module, a file within the selection area and having center coordinates are located within the selection area;
      determine one of:
         a first intersection of a ray that extends from center coordinates of a target file on the touchscreen along a direction parallel to a horizontal axis on the touchscreen and an edge of the selection area on the touchscreen, wherein a horizontal coordinate of one of two points on the edge of the area, which are adjacent to the first intersection, is greater than a horizontal coordinate of the first intersection, and wherein a horizontal coordinate of the other point is less than the horizontal coordinate of the first intersection; and
         a second intersection of a ray that extends from center coordinates of at least one file on the touchscreen along a direction perpendicular to a horizontal axis on the touchscreen and an edge of the selection area on the touchscreen, wherein a vertical coordinate of one of two points on the edge of the area, which are adjacent to the second intersection, is greater than a vertical coordinate of the second intersection, and wherein a vertical coordinate of the other point is less than the vertical coordinate of the second intersection;
      skip selecting the target file when the selecting module determines that the number of the first intersections or the second intersections is an even number; and
      select the target file when the selecting module determines that the number of the first intersections or the second intersections is an odd number.

10. The terminal according to claim 9, wherein the detecting module is configured to obtain coordinates of touch points on a touchscreen touched by the user on the terminal, and determine the touch track of the user on the terminal according to the coordinates of the touch points on the touchscreen.

11. The terminal according to claim 10, wherein the determining module is configured to:
   determine a first rectangular area by using the starting point of the track obtained by the detecting module as a center point;
   determine a second rectangular area by using a process ending point in a changing process of the track as a center point, wherein detection is started when the first area and the second area intersect for the first time and do not overlap; and
   determine that the area bounded by the track is the selection area when the first area and the second area are detected to intersect again.

12. The terminal according to claim 9, wherein the determining module is configured to:
   determine a first rectangular area by using the starting point of the track obtained by the detecting module as a center point;
   determine a second rectangular area by using a process ending point in a changing process of the track as a center point, wherein detection is started when the first area and the second area intersect for the first time and do not overlap; and
   determine that the area bounded by the track is the selection area when the first area and the second area are detected to intersect again.

\* \* \* \* \*